United States Patent [19]

Izumi

[11] 4,356,704
[45] Nov. 2, 1982

[54] REFRIGERANT COMPRESSOR PROTECTIVE SWITCH SYSTEM

[75] Inventor: Masao Izumi, Fujisawa, Japan

[73] Assignee: Nissan Motor Company, Limited, Kanagawa, Japan

[21] Appl. No.: 193,260

[22] Filed: Oct. 2, 1980

[51] Int. Cl.³ .......................... G05D 23/32; F25B 1/00
[52] U.S. Cl. .......................................... 62/158; 62/228; 62/323.4
[58] Field of Search .................. 62/228 D, 158, 323.4

[56] References Cited

U.S. PATENT DOCUMENTS

| | | | |
|---|---|---|---|
| 3,321,669 | 5/1967 | Rhodes | 62/158 UX |
| 3,852,648 | 12/1974 | Barry et al. | 62/158 X |
| 4,028,593 | 6/1977 | Newell | 62/158 X |

Primary Examiner—William E. Wayner

[57] ABSTRACT

In a compressor protective switch system for the refrigerant compressor of the refrigeration system of an automotive air conditioner, a pressure sensitive switch adapted to be open in response to a refrigerant pressure lower than a relatively high predetermined value is paralleled by a positive temperature coefficient (PTC) resistance element or a series combination of a PTC resistance element and an atmospheric temperature sensitive switch adapted to be open in response to an atmospheric temperature lower than a predetermined value.

5 Claims, 6 Drawing Figures

REFRIGERANT COMPRESSOR PROTECTIVE SWITCH SYSTEM

FIELD OF THE INVENTION

The present invention relates in general to a refrigerant compressor forming part of a refrigeration system of an air conditioner for automotive use and, in particular, to a protective switch system for use with such a refrigerant compressor. More particularly, the present invention is concerned with a compressor protective switch system adapted to stop the operation of a refrigerant compressor in the refrigeration system of an automotive air conditioner upon detection of a shortage of the refrigerant being circulated through the refrigeration system during operation of the air conditioner.

BRIEF DESCRIPTION OF THE BACKGROUND OF THE INVENTION

When a shortage of refrigerant takes place in the refrigeration system of an air conditioner, not only the refrigeration system will be starved but the refrigerant compressor forming part of the refrigeration system will fail to be properly lubricated. Insufficient lubrication of the refrigerant compressor results in overheating of the compressor and further in production of unusual noises in the compressor.

To avoid these inconveniences, it has been proposed and put into practice to provide a compressor protective switch system for the refrigerant compressor in the refrigeration system of an automotive air conditioner. The compressor protective switch system is electrically connected between a power source and an electromagnetic clutch of the refrigerant compressor and is adapted to stop the supply of current to the electromagnetic clutch from the power source through detection of a shortage of the refrigerant being circulated through the refrigeration system during operation of the air conditioner.

A known compressor protective switch system for the refrigerant compressor of the refrigeration system of an automotive air conditioner uses a pressure sensitive switch adapted to detect a shortage of the refrigerant in the refrigeration system from an unusual drop in the pressure of the refrigerant being circulated through the refrigeration system. The pressure sensitive switch is thus arranged to be open in response to a refrigerant pressure which is lower than a predetermiend value.

Problems are, however, encountered in a prior-art compressor protective switch system using such a pressure sensitive switch, as will be described in detail. An object of the present invention is to provide an improved compressor protective switch system which will eliminate the problems which have thus far been encountered in a conventional compressor protective switch system of the above described nature.

SUMMARY OF THE INVENTION

In accordance with the present invention, there is provided an improved protective switch system for a refrigerant compressor in a refrigeration system of an air conditioner for automotive use, wherein the improvement comprises a parallel combination of a pressure sensitive switch which is responsive to the pressure of the refrigerant to be circulated through the refrigeration system and which is operative to be open in response to a refrigerant pressure lower than a relatively high predetermined value, and a positive temperature coefficient resistance element connected in shunt across the pressure sensitive switch. The improvement according to the present invention may further comprise a temperature sensitive switch which is responsive to the temperature of atmospheric air and which is operative to be open in response to an atmospheric temperature lower than a predetermined value, the temperature sensitive switch being connected in series with the aforesaid positive temperature coefficient resistance element.

DESCRIPTION OF THE DRAWINGS

The drawbacks inherent in prior-art compressor protective switch systems and the features and advantages of an improved compressor protective switch system according to the present invention will be more clearly understood from the following description taken in conjunction with the accompanying drawings, wherein like reference numerals designate corresponding or similar units and elements and wherein.

DETAILED DESCRIPTION OF THE BACKGROUND OF THE INVENTION

Figure 1:
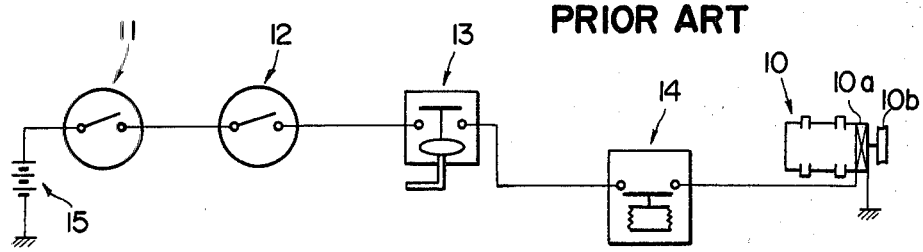
FIG. 1 is a schematic view showing a representative example of a prior-art compressor protective switch system for use with the refrigerant compressor of the refrigeration system of an automotive air conditioner.
Figure 2:
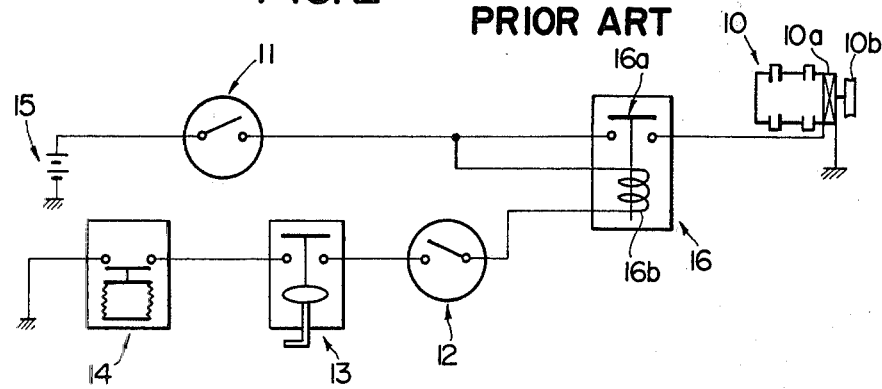
FIG. 2 is a view similar to FIG. 1 but shows another representative example of a prior-art refrigerant compressor protective switch system.

In each of FIGS. 1 and 2 of the drawings, a prior-art compressor protective switch system is shown provided for the protection of a refrigerant compressor 10. Though not shown in the drawings, the refrigerant compressor 10 forms part of a refrigeration system of an automotive air conditioner which further comprises an evaporator unit adapted to convert a refrigerant fluid into a gaseous state and a condenser unit adapted to convert the refrigerant from a gaseous state into a liquid state. The refrigerant compressor 10 per se is adapted to convert the low-temperature, low-pressure refrigerant gas from the evaporator unit into a high-temperature, high-pressure refrigerant gas and to deliver the same to the condenser unit. Between the refrigerant outlet end of the condenser unit and the inlet end of the evaporator unit is provided an expansion valve which communicates with the condenser unit through a liquid storage tank, as is well known in the art.

The refrigerant compressor 10 thus forming part of the refrigeration system of an automotive air conditioner has an electromagnetic clutch 10a which operatively intervenes between the compressor shaft and a pulley 10b which is to be driven by the engine of an automotive vehicle through an endless belt passed between the pulley 10b and a drive pulley connected to the output shaft of the engine, though not shown in the draiwngs.

To protect the refrigerant compressor 10 thus arranged, the prior-art compressor protective switch system shown in FIG. 1 comprises a series combination of an ignition switch 11, a manually-operated, normally-open compressor actuating switch 12, a thermostatic switch 13, and a pressure sensitive switch 14. The compressor actuating switch 12 is provided for the purpose of actuating the refrigerant compressor 10 and is usually installed on the dashboard (not shown) of an automotive vehicle. The thermostatic switch 13 is located in a piping leading from the outlet end of the evaporator unit of the refrigeration system and is thus responsive to the temperature of the refrigerant gas delivered from the evaporator unit. On the other hand, the pressure sensitive switch 14 is located in a piping leading from the liquid storage tank to the expansion valve of the refrigeration system and is responsive to the pressure of the refrigerant gas to be directed into the expansion valve. The thermostatic switch 13 is arranged to be normally closed and to open in response to a refrigerant temperature higher than a predetermined value and, likewise, the pressure sensitive switch 14 is arranged to be normally closed and to open in response to a refrigerant pressure lower than a predetermined value. Each of the predetermined values of the refrigerant temperature and pressure respectively selected for the switches 13 and 14 is such that is indicative of a critical shortage of the refrigerant in the refrigeration system.

The switches 11, 12, 13 and 14 are connected in series between an exciting coil (not shown) of the electromagnetic clutch 10a of the refrigerant compressor 10 and a d.c. power source 15 which is usually constituted by the battery for the ignition system of the engine. The clutch 10a is thus actuated to couple and accordingly the refrigerant compressor 10 is permitted to operate when the ignition switch 11 and the compressor actuating switch 12 are closed concurrently in so far as the temperature and the pressure of the refrigerant gas in the refrigeration system are respectively higher and lower than the respective predetermined values thereof.

On the other hand, the prior-art compressor protective switch system shown in FIG. 2 comprises a relay switch 16 having a normally open contact set 16a and an exciting coil 16b. The normally open contact set 16a is connected between a d.c. power source 15 and the exciting coil of the electromagnetic clutch 10a of the refrigerant compressor 10 across an ignition switch 11. The exciting coil 16b is connected between the power source 15 and ground across the ignition switch 11 and further across a series combination of a compressor actuating switch 12, a thermostatic switch 13 and a pressure sensitive switch 14. The switches 12, 13 and 14 are similar in function to their respective counterparts in the prior-art switch system hereinbefore described with reference to FIG. 1 of the drawings. The relay switch 16 is closed when the compressor switch 12, thermostatic switch 13 and pressure sensitive switch 14 are all closed concurrently. Thus, the refrigerant compressor 10 provided with the protective switch system arranged as shown in FIG. 2 is permitted to operate when these switches 12, 13 and 14 as well as the ignition switch 11 are closed concurrently.

In each of the conventional compressor protective switch systems shown in FIGS. 1 and 2, a shortage of the refrigerant in the refrigeration system of the air conditioner is, in this manner, detected from an unusual rise in the refrigerant temperature by means of the thermostatic switch 13 and/or an unusual drop in the refrigerant pressure by means of the pressure sensitive switch 14. When the quantity of the refrigerant being circulated in the refrigeration system is reduced to a critical value during operation of the air conditioner, at least one of the thermostatic switch 13 and the pressure sensitive switch 14 becomes open and thereby disconnects the exciting coil of the electromagnetic clutch 10a from the power source 15. This causes the clutch 10a to uncouple and thereby brings the refrigerant compressor 10 to a stop for permitting the refrigeration system to be replenished with an additional quantity of refrigerant.

During mild or hot weather conditions when the atmospheric temperature reaches values higher than the saturation temperature of the refrigerant gas, the pressure sensitive switch 14 in each of the prior-art switch systems shown in FIGS. 1 and 2 is subjected to the saturated vapor pressure of the refrigerant gas if there is at all a small amount of refrigerant remaining in a liquid state in the refrigeration system. For this reason, the pressure sensitive switch 14 could not detect the leakage of the refrigerant from the refrigeration system unless the amount of the refrigerant remnant in the refrigeration system is reduced to such an extent that the pressure of the refrigerant completely vaporized in the refrigeration system can not reach the saturated level. The fact is however that the refrigeration system is disabled from operating properly and the refrigerant compressor can not be lubricated satisfactorily if and when the amount of the refrigerant in the refrigeration system is reduced by 20 to 40 percent from the initial amount of charge. Unsatisfactory lubrication of the refrigerant compressor 10 causes overheating of the compressor and production of unusual noises from the compressor, as noted at the outset of the description.

In order to eliminate these problems in an air conditioner refrigeration system using a prior-art compressor protective switch system, it will be necessary to have the switch system arranged in such a manner as to be capable of responding to a condition in which only a limited amount of refrigerant has leaked out from the refrigeration system althrough there is a certain amount of refrigerant remaining in a liquid state in the refrigeration system. For this purpose, the pressure sensitive switch 14 may be designed to be open in response to a refrigerant pressure lower than a relatively high value so that the refrigerant compressor 10 can be made inoperative when the refrigerant being circulated in the refrigeration system is reduced by a certain limited amount.

If, however, the pressure sensitive switch 14 in the prior-art compressor protective switch system shown in FIG. 1 or 2 is designed in this fashion, the switch 14 will be made open in response to a refrigerant pressure at an atmospheric temperature within the range of, for example, from 10° C. to 15° C. If this occurs when it is desired to actuate the refrigerant compressor 10 for the purpose of dehumidifying the vehicle cabin, the compressor 10 can not be made operative with the pressure sensitive switch 14 held open.

The present invention contemplates provision of an improved compressor protective switch system to overcome these and other problems which have heretofore been encountered in prior-art compressor protective switch systems of the natures hereinbefore described with reference to FIGS. 1 and 2.

In a compressor protective switch system proposed by the present invention, a pressure sensitive switch is provided which is arranged similarly to the pressure sensitive switch 14 in the prior-art switch system shown in FIG. 1 or 2 but which is designed to be open in response to a refrigerant pressure lower than a relatively high predetermined value. The pressure sensitive switch in the switch system according to the present invention is shunted by a bypass element adapted to remain conductive for a certain period of time after the element is initially energized. The parallel combination of the pressure sensitive switch and the bypass element is connected to the exciting coil of the electromagnetic clutch of a refrigerant compressor across an ignition switch and a clutch actuating switch. The refrigerant compressor is, therefore, made operative without respect to the pressure of the refrigerant gas in the refrigeration system for a certain period of time after the ignition switch and the compressor actuating switch are closed. Upon lapse of such a period of time after the compressor is initially put into operation, the bypass element becomes non-conductive. By the point of time when the bypass element becomes non-conductive, the pressure sensitive switch is closed in response to the refrigerant pressure which has been increased to a certain level by the operation of the refrigerant compressor. After the bypass element is made non-conductive, the refrigerant compressor is permitted to remain operative with the pressure sensitive switch thus closed. In case the pressure of the refrigerant gas being circulated through the refrigeration system is reduced below the value predetermined for the pressure sensitive switch, the pressure sensitive switch becomes open and causes the refrigerant compressor to come to a stop. The operation of the refrigerant compressor is in this manner interrupted if and when a limited amount of leakage is detected to have taken place in the refrigeration system.

DESCRIPTION OF THE EMBODIMENTS

Figure 5:
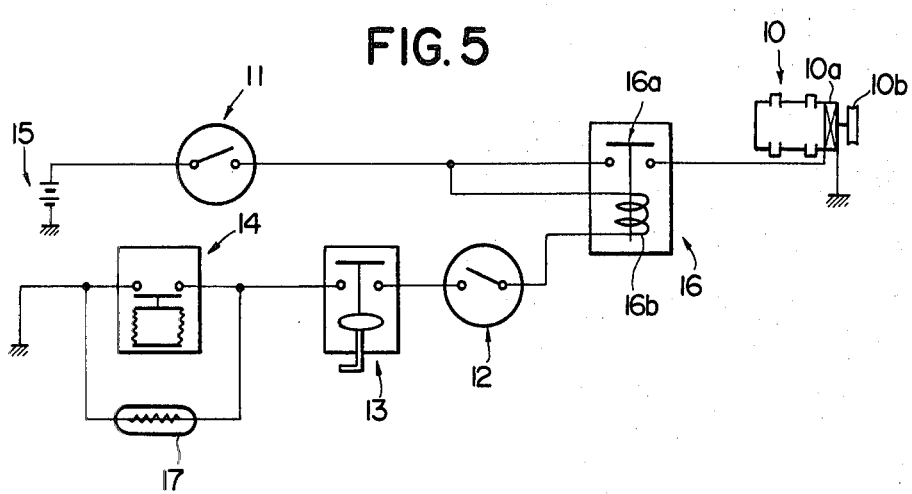
FIG. 5 is a schematic view showing a third embodiment of a compressor protective switch system according to the present invention, the third embodiment being an improved version of the prior-art switch system illustrated in FIG. 2.
Figure 6:
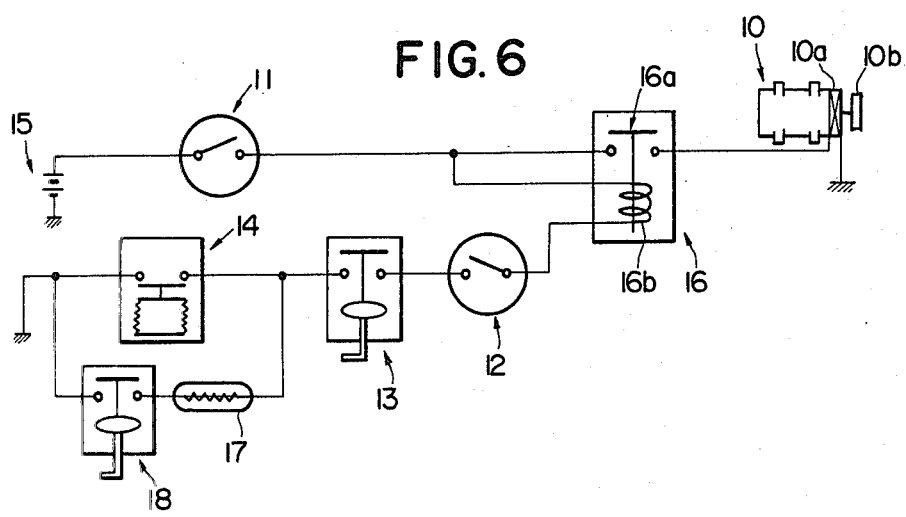
FIG. 6 is a schematic view showing a fourth embodiment of a compressor protective switch system according to the present invention, the fourth embodiment being another improved version of the prior-art switch system shown in FIG. 2.

Description will be hereinafter made with reference to FIGS. 3 to 6 which show the embodiments of a compressor protective switch system according to the present invention. The embodiments shown in FIGS. 3 and 4 are improved versions of a prior-art compressor protective switch of the type illustrated in FIG. 1, while the embodiments shown in FIGS. 5 and 6 are improved versions of a prior-art compressor protective switch system of the type illustrated in FIG. 2.

Figure 3:
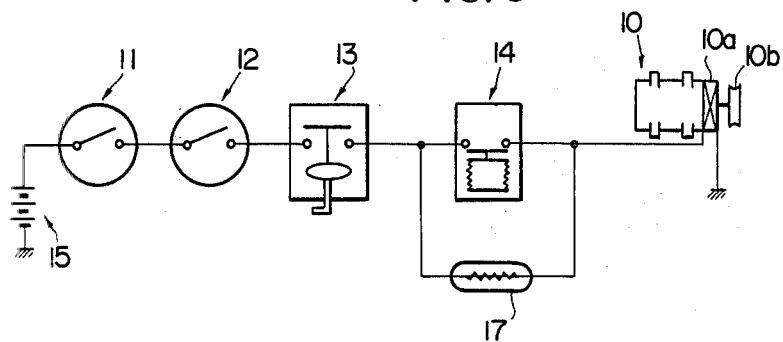
FIG. 3 is a schematic view of a first embodiment of a compressor protective switch system according to the present invention, the first embodiment being an improved version of the prior-art switch system shown in FIG. 1.
Figure 4:
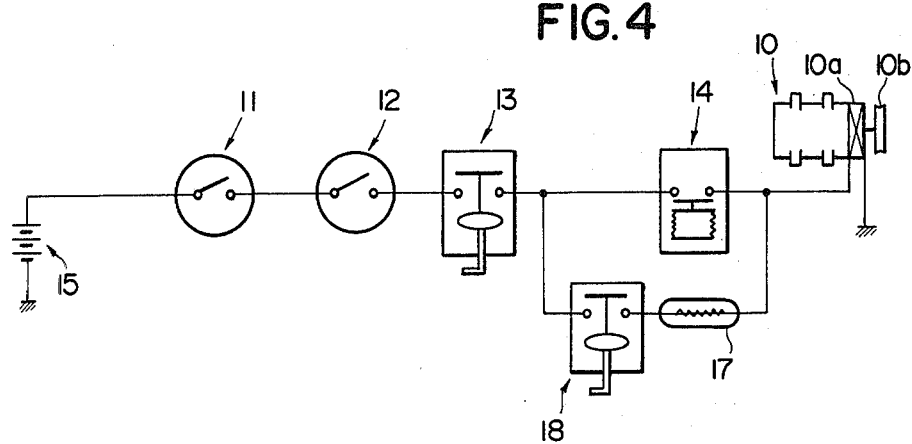
FIG. 4 is a schematic view of a second embodiment of a compressor protective switch system according to the present invention, the second embodiment being an another improved version of the prior-art switch system shown in FIG. 1.

Thus, each of the compressor protective switch systems shown in FIGS. 3 and 4 comprises a series combination of an ignition switch 11, a clutch actuating switch 12, a thermostatic switch 13 and a pressure sensitive switch 14. The switches 11, 12 and 13 are all similar in function to their respective counterparts in the prior-art switch system of FIG. 1. The pressure sensitive switch 14 is arranged basically similarly to its counterpart in the switch system shown in FIG. 1 but is designed to be open in response to a refrigerant pressure lower than a relatively high value. The four switches 11, 12, 13 and 14 are connected in series between a d.c. power source 15 and the exciting coil (not shown) of an electromagnetic 10a of an engine driven refrigerant compressor 10.

The embodiment illustrated in FIG. 3 further comprises a positive temperature coefficient (PTC) resistance element 17 connected in shunt across the pressure sensitive switch 14. The PTC resistance element 17 is preferably constituted by a positive temperature coefficient ceramic thermistor composed of a barium titanate-based semiconductor. As is well known in the art, such a PTC resistance element has an extremely small electric resistance at temperatures lower than a certain transitive value which usually lies within the range between about 150° C. and 200° C. When an electric current is passed therethrough, the resistance element is heated and exhibits a resistance which increases steeply as the temperature thereof rises beyond the transitive value. As the temperature of the resistance element further increases, the resistance of the element increases to such an extent as to prohibit passage of current therethrough.

When the ignition switch 11 and the compressor actuating switch 12 are closed and if, in this instance, the thermostatic switch 13 located adjacent the evaporator unit of the refrigeration system is also closed, an electric current is supplied to the exciting coil of the electromagnetic clutch 10a of the refrigerant compressor 10 initially through the ignition switch 11, compressor actuating switch 12, thermostatic switch 13 and PTC resistance element 17. For a certain period of time after the switches 11 and 12 are closed, the exciting coil of the electromagnetic clutch 10a of the refrigerant compressor 10 is thus energized from the power source 15 through the PTC resistance element 17 without respect to the pressure of the refrigerant gas being circulated through the compressor 10. The current being passed through the PTC resistance element 17 causes the resistance element to be heated so that the resistance thereof increases steeply as the temperature of the resistance element rises toward the above mentioned transitive value. As the temperature of the PTC resistance element 17 increases beyond the transitive value, the resistance element 17 becomes nonconductive and interrupts passage of current therethrough. If, in this instance, the refrigeration system including the refrigerant compressor 10 is charged with a sufficient amount of refrigerant, the pressure sensitive switch 14 is responsive to a refrigerant pressure higher than the value predetermined for the switch 14 and is closed by the point of time when the PTC resistance element 17 is rendered non-conductive. The exciting coil of the electromagnetic clutch 10a of the refrigerant compressor 10 is now energized from the power source 15 through the ignition switch 11, compressor actuating switch 12, thermostatic switch 13 and pressure sensitive switch 14 and is thus permitted to continue to operate.

If, however, the pressure of the refrigerant gas in the refrigeration system is lower than the predetermined value due to, for example, leakage of the refrigerant therefrom, the pressure sensitive switch 14 is open when and after the PTC resistance element 17 is rendered non-conductive. In this instance, the refrigerant compressor 10 ceases its operation simultaneously when the PTC resistance element 17 is made non-conductive upon lapse of a certain period of time after the switches 11 and 12 are closed. The refrigerant compressor 10 is also made inoperative during operation of the refrigeration system if and when the pressure of the refrigerant being circulated through the refrigeration system is reduced below the value of the refrigerant pressure predetermined for the pressure sensitive switch 14 in the course of operation of the refrigeration system.

In the embodiment illustrated in FIG. 4 the pressure sensitive switch 14 is shunted by a series combination of a PTC resistance element 17 and an atmospheric temperature sensitive switch 18. The PTC resistance element 17 is similar in function to its counterpart in the switch system of FIG. 3, while the atmospheric temperature sensitive switch 18 is responsive to the temperature of atmospheric air and is operative to be open in response to an atmospheric temperature lower than a predetermined value. The compressor protective switch system shown in FIG. 4 is, thus, adapted to cause the refrigerant compressor 10 to come to a stop not only when the pressure of the refrigerant gas in the refrigeration system is reduced below a predetermined value but when the atmospheric temperature is lower than the value predetermined for the temperature sensitive switch 18.

Turning to FIGS. 5 and 6, each of the compressor protective switch systems herein shown is constructed and arranged basically similarly to a prior-art switch system of the type illustrated in FIG. 2 and thus comprises a relay switch 16 having a normally-open contact set 16a and an exciting coil 16b. The contact set 16a is connected between a d.c. power source 15 and the exciting coil of the electromagnetic clutch 10a of the refrigerant compressor 10 across an ignition switch 11. The exciting coil 16b is connected between the power source 15 and ground across the ignition switch 11 and a series combination of a compressor actuating switch 12, a thermostatic switch 13 and a pressure sensitive switch 14. The switches 11, 12 and 13 are all similar in function to their respective counterparts in the prior-art switch system shown in FIG. 2. The pressure sensitive switch 14 is arranged and designed similarly to its counterparts in the embodiments of FIGS. 3 and 4 and is thus adapted to be open in response to a refrigerant pressure lower than a relatively high predetermined value.

The embodiment shown in FIG. 5 further comprises a PTC resistance element 17 connected in parallel with the pressure sensitive switch 14. The PTC resistance element 17 is similar in function to its counterpart in the embodiment of FIG. 3 and, thus, it will be apparent that the embodiment shown in FIG. 5 is adapted to achieve substantially the same functions as those attainable by the embodiment of FIG. 3.

In the embodiment of FIG. 6, on the other hand, the pressure sensitive switch 14 is shunted by a series combination of a PTC resistance element 17 and an atmospheric temperature sensitive switch 18. The PTC resistance element 17 and the temperature sensitive switch 18 incorporated into the embodiment of FIG. 6 are similar in function to their respective counterparts in the embodiment of FIG. 4 and, thus, it will also be apparent that the embodiment of FIG. 6 is operable similarly to the embodiment of FIG. 4.

As will have been appreciated from the foregoing description, the compressor protective switch system proposed by the present invention is characterized in that the refrigerant pressure sensitive switch forming part of the switch system is paralleled by a PTC resistance element. The refrigerant compressor is therefore enabled to operate until the PTC resistance element is heated to a certain transitive temperature after the ignition switch and the compressor actuating switch also incorporated into the switch system are closed. In so far as the refrigeration system is charged with a sufficient amount of refrigerant, the refrigerant gas being circulated through the refrigeration system is compressed by the refrigerant compressor to a pressure higher than the value of the relatively high refrigerant pressure predetermined for the pressure sensitive switch by the time when the PTC resistance element is rendered non-conductive. Even when the refrigeration system is operated at a relatively low atmospheric temperature (of, for example, 10° C. to 15° C.), the refrigerant compressor is permitted to continue its operation after the PTC resistance element is turned non-conductive. Since the refrigerant pressure predetermined for the pressure sensitive switch can thus be selected at a relatively high value, the refrigerant compressor can be brought to a full stop before the refrigerant in the refrigeration system is reduced to a critical degree.

In a prior-art compressor protective switch system, the refrigerant pressure sensitive switch is designed to be open in response to a refrigerant pressure lower than about 1 to 2 kgs/cm$^2$ in gauge pressure so that the refrigerant compressor is maintained operative unless the refrigerant in the refrigeration system is reduced by nearly 90 percent. On the other hand, the refrigerant pressure sensitive switch incorporated in the switch system according to the present invention can be designed to be open in response to a refrigerant pressure lower than about 8 to 10 kgs/cm$^2$ in gauge pressure so that the refrigerant compressor can be brought to a stop when the refrigerant in the refrigeration system is reduced by approximately 20 to 40 percent from the initial amount of charge.

The compressor protective switch system proposed by the present invention is further characterized by the provision of an atmospheric temperature sensitive switch connected in series with the PTC resistance element. When the atmospheric temperature is reduced below, for example, 0° C., the atmospheric temperature switch is caused to open and disables the refrigerant compressor from operating. The engine and the engine cranking motor associated with the refrigeration system are therefore protected from being heavily loaded during cranking and at an incipient stage after the engine is started.

It has been described that the PTC resistance element or the series combination of the PTC resistance element and the atmospheric temperature sensitive switch in each of the embodiments of the present invention is connected in association with the refrigerant pressure sensitive switch. It will however be apparent that the PTC resistance element or the combination of the PTC resistance element and the atmospheric temperature sensitive switch may be connected in parallel with the thermostatic switch 13 which constitutes a refrigerant temperature sensitive switch in each of the embodiments hereinbefore described with reference to the drawings.

What is claimed is:

1. A protective switch system for an electromagnetically operated clutch of a refrigerant compressor in a refrigeration system of an air conditioner for automotive use, wherein the improvement comprises a parallel combination of a pressure sensitive switch which is responsive to the pressure of the refrigerant to be circulated through said refrigeration system and which is operative to be open in response to a refrigerant pressure lower than a predetermined value on the high pressure side of the system, a positive temperature coefficient resistance element connected in parallel with said pressure sensitive switch, the parallel combination being connected in series with said clutch, and a temperature sensitive switch responsive to the temperature of atmospheric air and operative to be open in response to an atmospheric temperature lower than a predetermined value, said temperature sensitive switch being connected in series with said positive temperature coefficient resistance element.

2. A protective switch system as set forth in claim 1, wherein said resistance element consists of a positive temperature coefficient ceramic thermistor.

3. A protective switch system as set forth in claim 1, further comprising a refrigerant temperature sensitive switch which is responsive to the temperature of the refrigerant to be circulated through said refrigeration system and which is operative to be open in response to a refrigerant temperature higher than a predetermined value, the refrigerant temperature sensitive switch being connected in series with said pressure sensitive switch.

4. A protective switch system as set forth in claim 1, further comprising a relay switch having normally open contact elements electrically connected between said electromagnetic clutch and a power source and an exciting coil connected between said power source and said pressure sensitive switch for causing said contact elements to close when energized from said power source through said pressure sensitive switch.

5. A protective switch system as set forth in claim 4, further comprising a refrigerant temperature sensitive switch which is responsive to the temperature of the refrigerant to be circulated through said refrigeration system and which is operative to be open in response to a refrigerant temperature higher than a predetermined value, the refrigerant temperature sensitive switch being connected in series with said pressure sensitive switch.

* * * * *